United States Patent
Zhang et al.

(10) Patent No.: US 11,860,526 B2
(45) Date of Patent: Jan. 2, 2024

(54) BEAM MODULATION APPARATUS AND PROJECTION SYSTEM

(71) Applicant: BEIJING ASU TECH CO. LTD., Beijing (CN)

(72) Inventors: Jinwang Zhang, Beijing (CN); Teng Cao, Beijing (CN); Wei-Chih Lin, Beijing (CN); Xianlu Wang, Beijing (CN); Zhigang Liu, Beijing (CN)

(73) Assignee: BEIJING ASU TECH CO. LTD., Beijing (CN)

( * ) Notice: Subject to any disclaimer, the term of this patent is extended or adjusted under 35 U.S.C. 154(b) by 109 days.

(21) Appl. No.: 17/616,644

(22) PCT Filed: Jun. 5, 2020

(86) PCT No.: PCT/CN2020/094593
§ 371 (c)(1),
(2) Date: Dec. 4, 2021

(87) PCT Pub. No.: WO2020/244621
PCT Pub. Date: Dec. 10, 2020

(65) Prior Publication Data
US 2022/0236633 A1    Jul. 28, 2022

(30) Foreign Application Priority Data
Jun. 6, 2019 (CN) .......................... 201910491333.1

(51) Int. Cl.
*G03B 21/00* (2006.01)
*H04N 9/31* (2006.01)
(Continued)

(52) U.S. Cl.
CPC ........... *G03B 21/2073* (2013.01); *G02B 3/04* (2013.01); *G02B 5/0205* (2013.01);
(Continued)

(58) Field of Classification Search
CPC .............. G03B 21/006; G03B 21/2073; H04N 9/3105; H04N 9/3102
See application file for complete search history.

(56) References Cited

U.S. PATENT DOCUMENTS

2009/0207379 A1* 8/2009 Oakley ................ G03B 21/208
359/485.06
2010/0110383 A1* 5/2010 Tang .................... H04N 9/3167
353/8
(Continued)

FOREIGN PATENT DOCUMENTS

CN   105824177 A    8/2016
WO   2013110238 A1  8/2013

OTHER PUBLICATIONS

International Preliminary Report on Patentability over PCT/CN2020/094593, issued by International Bureau of WIPO, dated Dec. 7, 2021.
(Continued)

*Primary Examiner* — Ryan D Howard
(74) *Attorney, Agent, or Firm* — PATTAO, LLC; Junjie Feng

(57) ABSTRACT

Provided include a beam modulation apparatus for modulating an input light field and a projection system containing the apparatus. The input light field has a first light field and a second light field, having a difference of 90° in their polarization states. The apparatus includes a PBS prism, a first LCOS panel and a second LCOS panel. The first and the second LCOS panel are respectively over a side surface of the PBS prism opposing to an optical incident surface and an optical exit surface. Each LCOS panel comprises a plurality of pixels over a reflective surface thereof, with each pixel controllably switched on or off such that a polarity state of a light beam reflected by a portion of the reflective surface corresponding thereto is changed or remains unchanged.

(Continued)

This beam modulation apparatus can be applied in a projection system, such as a laser TV projection system.

16 Claims, 8 Drawing Sheets

(51) Int. Cl.
| | |
|---|---|
| G03B 21/20 | (2006.01) |
| G02B 3/04 | (2006.01) |
| G02B 5/02 | (2006.01) |
| G02B 5/26 | (2006.01) |
| G02B 5/30 | (2006.01) |
| G02B 26/00 | (2006.01) |
| G02B 27/09 | (2006.01) |
| G02B 27/28 | (2006.01) |
| G02B 27/30 | (2006.01) |
| G02B 27/48 | (2006.01) |
| G02F 1/01 | (2006.01) |
| G02F 1/1362 | (2006.01) |

(52) U.S. Cl.
CPC ............ *G02B 5/0278* (2013.01); *G02B 5/26* (2013.01); *G02B 5/3083* (2013.01); *G02B 26/008* (2013.01); *G02B 27/0922* (2013.01); *G02B 27/0927* (2013.01); *G02B 27/0938* (2013.01); *G02B 27/283* (2013.01); *G02B 27/286* (2013.01); *G02B 27/30* (2013.01); *G02B 27/48* (2013.01); *G02F 1/0136* (2013.01); *G02F 1/136277* (2013.01); *G03B 21/005* (2013.01); *G03B 21/204* (2013.01); *G03B 21/208* (2013.01); *G03B 21/2013* (2013.01); *G03B 21/2066* (2013.01); *G02F 2203/02* (2013.01)

(56) References Cited

U.S. PATENT DOCUMENTS

2013/0286357 A1* 10/2013 Kodama ................ G02B 27/14
353/20
2022/0100074 A1* 3/2022 Yasui ..................... G03B 33/12

OTHER PUBLICATIONS

First Office Action over CN 201910491333.1 issued by the State Intellectual Property Office of PRC (SIPO), dated Jan. 22, 2021.

* cited by examiner

BEAM MODULATION APPARATUS AND PROJECTION SYSTEM

CROSS-REFERENCE TO RELATED APPLICATIONS

The present application is U.S. national entry application of International Patent Application No. PCT/CN2020/094593, filed Jun. 5, 2020, which claims priority to Chinese Patent Application No. 201910491333.1 filed on Jun. 6, 2019. The disclosures of these two patent applications are hereby incorporated by reference in their entirety.

TECHNICAL FIELD

This present disclosure relates generally to the field of laser display technologies, and more specifically to a beam modulation apparatus and a projection system.

BACKGROUND

A laser TV projection system is a device that has been widely applied in our daily life, which utilizes a light valve to control a projection light source to generate a projection image, and then utilizes a projection lens to enlarge the projection image for display on a projection screen. At present, most existing laser TV projection systems comprise a single-piece light valve or a three-piece light valve. A single-piece light valve, as referred to herein, means one piece of light valve which is utilized to load RGB (red, green, and blue) signals by means of time division. A three-piece light valve, as referred to herein, means three pieces of light valves which are utilized to respectively load the RGB (red, green and blue) signals.

At present, in systems applying a one-piece light valve, typically a one-color pure laser light source is used to excite a RGB or a RGBY (red, green, blue, and yellow) fluorescence wheel. Due to the influence of time division, defects such as low display brightness and low image quality are observed. Due further to the limitation of the extension invariance of the light source and the light valve, in order to improve the display brightness, the size of the light valve needs to be increased, which in turn results in a larger object surface of the UST (i.e. ultra short throw) projection lens. Consequently, if the lens size becomes larger, the body size of the whole system correspondingly becomes larger. In systems applying a three-color pure laser source, because of the limitation by prices of the green and red semiconductor laser diodes, the overall cost is quite high, and there is also an issue of the laser speckle effect. Although the laser TV projection system having the three-piece light valve has advantages such as high brightness and high image quality, due to factors such as the split folding of the relay optical paths, too many lens elements are used, which results in an elongated rear intercept of the UST projection lens. Under a same aperture condition, the size of the UST projection lens becomes increased.

At present, there is yet no laser TV projection system that is miniaturized, at a low cost, and has high brightness.

SUMMARY

In view of the disadvantages associated with existing laser TV projection systems, this present disclosure provides an optical beam modulation apparatus and a projection system.

In one aspect, the present disclosure provides a beam modulation apparatus for modulating an input light field entering thereinto along a first axis so as to obtain an output light field exiting therefrom along a second axis orthogonal to the first axis. The input light field comprises a first light field and a second light field, having an S-polarization state and a P-polarization state respectively or a P-polarization state and an S-polarization state respectively.

The beam modulation apparatus includes a polarizing beam splitter (PBS) prism and a liquid crystal on silicon (LCOS) assembly. The PBS prism includes two right-angle prisms attached with each other on their respective base surfaces, arranged such that both the first axis and the second axis have substantially 45° relative to an interface therebetween. The PBS prism is provided with an optical incident surface allowing the input light field to enter therethrough and an optical exit surface allowing the output light field to exit therefrom, and the interface of the PBS prism is configured to selectively allow a P-polarized incoming light to transmit therethrough and an S-polarized incoming light to reflect thereby. The LCOS assembly includes a first LCOS panel and a second LCOS panel. The first LCOS panel is over a first side surface of the PBS prism opposing to the optical incident surface, aligned such that a light incident thereon is reflected back towards the PBS prism along the first axis. The second LCOS panel is over a second side surface of the PBS prism opposing to the optical exit surface, aligned such that a light incident thereon is reflected back towards the PBS prism along the second axis. Each of the first LCOS panel and the second LCOS panel comprises a plurality of pixels over a reflective surface thereof, wherein each of the plurality of pixels is configured to be controllably switched on or off such that a polarity state of a light beam reflected by a portion of the reflective surface corresponding thereto is changed or remains unchanged.

Optionally, the input light field is a white light field coupled by three primary colour lights (i.e. the three primary colour lights together form a composite/coupled white light field). The first light field comprises two primary colour lights, coupled with one another in a time-sharing manner, and the second light field comprises the last primary colour light. The PBS prism further comprises a polarizing means sandwiched between the base surfaces of the two right-angle prisms, which can be a polarizing spectroscopic film or a wire grid. The beam modulation apparatus can further include one or two quarter-wave plates, sandwiched between the PBS prism and the first and/or second LCOS panels. In the beam modulation apparatus, a extinction ratio for a transmitted beam for the PBS prism can be at least 500:1, and more preferably at least 1000:1. Each of the two right-angle prisms can include an optical glass, such as N-SF1, H-ZF3, or H-ZLAF. In the beam modulation apparatus, at least one of the optical incident surface, the optical exit surface, the first side surface, or the second side surface of the PBS prism is coated with an anti-reflection film, which can be used to reduce Fresnel reflections thereon.

In another aspect, the present disclosure further provides a projection system, which includes a beam modulation apparatus according to any of the embodiments as described above.

In the projection system, the input light field can be a white light field coupled by three primary colour lights, with the first light field comprising two of the three primary colour lights that are coupled with one another in a time-sharing manner, and with the second light field comprising the last of the three primary colour lights.

The projection system can further include a polarization modulation apparatus configured, upon receiving a third light field and a fourth light field having a substantially same polarization state, to modulate a polarization state of one, but not another, of the third light field and the fourth light field to correspondingly output the first light field and the second light field respectively. Optionally, the polarization modulation apparatus can rotate a linear polarization axis of the one of the third light field and the fourth light field by 90°. As such, the polarization modulation apparatus can be a Faraday rotator, a Birefringent rotator (e.g. a half-wave plate), or a prism rotator.

The projection system can further include a polarization apparatus configured to polarize a non-polarized fifth light field and a non-polarized sixth light field incident thereinto to correspondingly output the third light field and the fourth light field respectively. The polarization apparatus can include a front fly-eye lens that is configured to optically divide each of the fifth light field and the sixth light field into a plurality of beams, a rear fly-eye lens that is configured to focus the plurality of beams on a rear surface thereof, and a PCS polarizing array of prisms that is configured to polarize the focused plurality of beams to obtain the third light field and the fourth light field.

The projection system can further include a light source apparatus configured to provide the fifth light field and the sixth light field. Optionally, the fifth light field and the sixth light field can be configured to together form a white light field, with the fifth light field being a time-sharing coupling light field comprising a first primary colour light and a second primary colour light (i.e. the first and second primary color lights are coupled in a time-sharing manner to form the fifth light field), and with the sixth light field comprising a third primary colour light.

Optionally, the first primary colour light is a blue light; and the second primary colour light and the third primary colour light are respectively a green light and a red light, or are respectively a red light and a green light. In the projection system, the light source apparatus can be configured to emit the first primary colour light, and can be further configured to obtain each of the second primary colour light and the third primary colour light by excitation on a corresponding fluorescence material by the first primary colour light. Optionally, the light source apparatus can be configured to emit the first primary colour light and the second primary colour light, and is further configured to obtain the third primary colour light by excitation on a corresponding fluorescence material by the first primary colour light or the second primary colour light.

The light source apparatus can include a light source module (e.g. a laser module), and two fluorescence plate comprising a first fluorescence plate and a second fluorescence plate. The light source module includes a first light source sub-module and a second light source sub-module, which are configured to respectively emit a first beam of the first primary colour light and a second beam of the first primary colour light. The first fluorescence plate and a second fluorescence plate are optically aligned with, and configured to receive, the first beam of the first primary colour light and the second beam of the first primary colour light respectively. The first fluorescence plate comprises a transmission zone and a first fluorescence zone on a surface thereof facing the first beam of the first primary colour light. The first fluorescence zone comprises a first fluorescence material (i.e. a first dye) capable of generating the second primary colour light upon excitation by the first primary colour light. The first fluorescence plate is further configured to have the transmission zone and the first fluorescence zone to alternately face (i.e. align so as to receive) the first beam of the first primary colour light in a predetermined manner (i.e. alternating with a predetermined temporal pattern such as 50 ms for the transmission zone and 150 ms for the first fluorescence zone) such that the first beam of the first primary colour light transmitted through the transmission zone and a beam of the second primary colour light generated by and from the first fluorescence zone are coupled in a time-sharing manner to be outputted as the fifth light field. The second fluorescence plate includes a second fluorescence zone comprising a second fluorescence material (i.e. a second dye) on a surface thereof facing (i.e. aligning with) the second beam of the first primary colour light, configured such that upon excitation by the second beam of the first primary colour light, a beam of the third primary colour light is generated by and from the second fluorescence zone is outputted as the sixth light field.

Herein, the first fluorescence plate can be in a form of a spinning wheel (i.e. spinning color wheel), with each of the transmission zone and the first fluorescence zone arranged in a fan-shaped area thereon. Angles of the transmission zone and of the first fluorescence zone can be complementary (i.e. with a sum of 360°), and are approximately between 89°-91° and approximately 269°-271°, respectively. The spinning wheel can have a spinning rate of at least 7,200 rpm. The second fluorescence plate can also be in a form of a spinning wheel.

Optionally, the light source apparatus further comprises a set of reflectors, which are arranged such that an optical path of the first beam of first primary colour light transmitted through the transmission zone is redirected to optically combine with an optical path of the beam of second primary colour light to thereby give rise to the fifth light field.

In the light source module, each of the first light source sub-module and the second light source sub-module can include a laser diode array, and the light source module can further include a first collimating lens array and a second collimating lens array, which are arranged over a light-emitting surface of the first light source sub-module and the second light source sub-module respectively. Sub-eyes in each of the first collimating lens array and the second collimating lens array are arranged to correspondingly align with laser diodes in the laser diode array of a corresponding light source sub-module. Each sub-eye can include a hyperbolic aspheric lens, having a curved surface expressed as:

$$z = \frac{c_x x^2 + c_y y^2}{1 + \sqrt{1 - (1 + k_x)c_x^2 x^2 - (1 + k_y)c_y^2 y^2}};$$

where $C_x$ is a curvature of the hyperbolic aspheric lens in an x-direction, $C_y$ is a curvature of the hyperbolic aspheric lens in a y-direction, $K_x$ is a conic coefficient of the hyperbolic aspheric lens in the x-direction, and $K_y$ is the conic coefficient of the hyperbolic aspheric lens in the y-direction.

The light source apparatus can further include a first dichroic filter and a second dichroic filter, arranged over a light-emitting surface of the first light source sub-module and the second light source sub-module respectively and configured to filter each of the first beam of the primary colour light and the second beam of the primary colour light respectively. A far field of the first primary color light can be in a Gaussian distribution, and the projection system further includes a first diffusion plate and a second diffusion plate, which are respectively arranged between the first light source sub-module and the first dichroic filter and between the second light source sub-module and the second dichroic filter. The first diffusion plate and the second diffusion plate are configured to diffuse the first beam of the first primary colour light and the second beam of the first primary colour light, such that a far field thereof is expanded to have a bi-directional flat top like distribution. Each of the first diffusion plate and the second diffusion plate can be configured to have two-way diffusion characteristics, having a diffusion half angle of approximately 1.2°-1.8°, and preferably 1.5° in a horizontal direction and of approximately 0.65°-1.05°, and preferably 0.85° in a pitch direction.

The light source apparatus can further include at least one means for eliminating a speckle of a light field formed by the first primary colour light, including: (1) the transmission zone comprising a fan-shaped diffusion plate; (2) a collimation lens module arranged over a light-emitting surface of the first fluorescence plate; and (3) a collimation compensation lens and a third diffusion plate arranged on an optical path of the first beam of first primary colour light, wherein the third diffusion plate is configured to have a continuously small movement. Herein, the third diffusion plate can be mechanically coupled (or connected) with a vibration motor, configured to have vibration frequency between 100 Hz and 300 Hz, and the third diffusion plate can have a diffusion half angle between 2° and 3°.

The light source apparatus can further include a first focusing lens module and a second focusing lens module, which are respectively arranged between the first dichroic filter and the first fluorescence plate and between the second dichroic filter and the second fluorescence plate. Each of the first focusing lens module and the second focusing lens module comprises, along a light transmission direction, a first focusing lens sub-module and a second focusing lens sub-module, respectively comprising an aspheric lens and a spherical lens. Herein, the aspheric surface of the aspheric lens is expressed as:

$$z = \frac{c\rho^2}{1 + \sqrt{1 - (1+k)c^2\rho^2}} + \Sigma A_n \rho^{2n};$$

where c is a curvature at a sphere vertex, k is a coefficient of an aspherical surface of a quadratic term, $A_n$ is a coefficient of the aspherical surface of a higher-order term, n is taken as 2-7, and ρ is a normalized radial coordinate.

In the projection system, optionally, the light source apparatus can be configured to emit the third primary colour light, and can be further configured to obtain each of the first primary colour light and the second primary colour light by excitation on a corresponding fluorescence material by the third primary colour light. The light source apparatus can include a light source module and a third fluorescence plate. The light source module can include a third light source sub-module and a fourth light source sub-module, which are configured to respectively emit a first beam of the third primary colour light and a second beam of the third primary colour light. The third fluorescence plate is optically aligned with the first beam of the third primary colour light, and comprises a third fluorescence zone and a fourth fluorescence zone on a surface thereof facing the first beam of the third primary colour light. The third fluorescence zone comprises a third fluorescence material capable of generating the first primary colour light upon excitation by the third primary colour light. The fourth fluorescence zone comprises a fourth fluorescence material capable of generating the second primary colour light upon excitation by the third primary colour light. The third fluorescence plate is further configured to have the third fluorescence zone and the fourth fluorescence zone to alternately face the first beam of the third primary colour light in a predetermined manner such that a beam of the first primary colour light generated on the third fluorescence zone and a beam of the second primary colour light generated on the fourth fluorescence zone are coupled in a time-sharing manner to be outputted as the fifth light field. The second beam of the third primary colour light is outputted as the sixth light field. Herein, in one example, the first primary colour light and the second primary colour can be respectively a green light and a red light, or can be respectively a red light and a green light, and the third primary colour light can be a blue light.

Throughout the disclosure, the terms "module", "unit", or alike, are referred to as one specific optical device or an assembly of multiple optical components or devices that perform a specified functionality.

Throughout the disclosure, the relatively terms "approximately", "about", "around", or alike, that are behind a number, are referred to as a description of an actual number that is within 5% of the indicated number. In one illustrating example, "approximately 1.00" can be interpreted that the actual number is between 0.95 and 1.05.

DETAILED DESCRIPTION OF THE INVENTION

In the following, with reference to the drawings that accompany this disclosure, the technical solutions provided in the various embodiments of the disclosure are described in greater detail. It should be noted that the embodiments provided in the disclosure shall be considered to represent only part, but not all, of the embodiments that the present disclosure covers, and thus shall not be considered to impose any limitation on the protection scope of the disclosure. Based on the embodiments provided herein, other embodiments with slight variations in designs, as long as they follow the gist of the invention disclosed herein, and can be easily obtained by people of ordinary skills in the art without involving any creative work, shall be considered to be covered by the scope of the disclosure.

In a first aspect, the present disclosure provides a beam modulation apparatus, which is configured to modulate and/or redirect an input light field entering thereinto to thereby obtain an output light field.

Figure 1A:
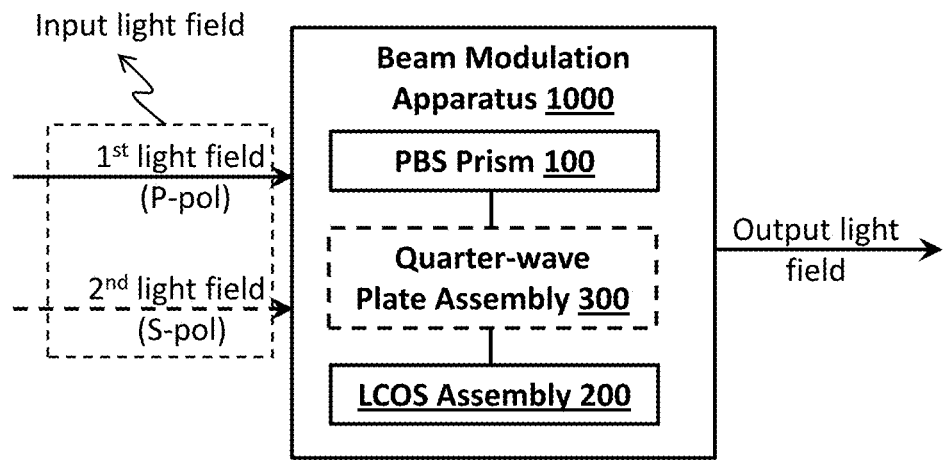
FIG. 1A and FIG. 1B respectively illustrate a block diagram and a structural diagram of a beam modulation apparatus provided by some embodiments of the disclosure.

FIG. 1A shows a block diagram of a beam modulation apparatus provided by some embodiments of the disclosure. As illustrated, the beam modulation apparatus 1000 includes a PBS prism 100 and a liquid crystal on silicon (LCOS) assembly 200, which are optically coupled with each other to modulate an input light field before outputting an output light field. The input light field is configured to be a composite light field including two spatially coupled light fields, i.e. a first light field and a second light field, which are both linearly polarized optical beams but have two different orthogonal linear polarization states (i.e. S polarization state and P polarization state). In other words, in the input light field configured to enter into the beam modulation apparatus 1000, the first light field and the second light field are configured to be a P-polarized optical beam and an S-polarized optical beam respectively (as illustrated in FIG. 1A), or alternatively to be an S-polarized optical beam and a P-polarized optical beam respectively (not shown in the drawings).

Herein optionally, the input light field is further configured to be a white light field which is coupled by three primary colour lights. Specifically, the first light field can comprise two primary colour light (e.g. the first and second primary colour lights), which are coupled with each other in a time-sharing manner, whereas the second light field comprises the last primary colour light (i.e. the third primary colour light). Such a configuration for the input light field allows the beam modulation apparatus 1000 to be used as part of a projection system, such as a TV projection system or a microdisplay system (e.g. virtual reality (VR), augmented reality (AR) display, etc.) to project/display color images based on the output light field emitted therefrom.

Optionally, the beam modulation apparatus 1000 can further include a quarter-wave plate assembly 300 (as shown by the box with broken lines in FIG. 1A), which is optically coupled with both the PBS prism 100 and the LCOS assembly 200, and is configured to increase the contrast of the output light field emitted from the beam modulation apparatus 1000.

Figure 1B:
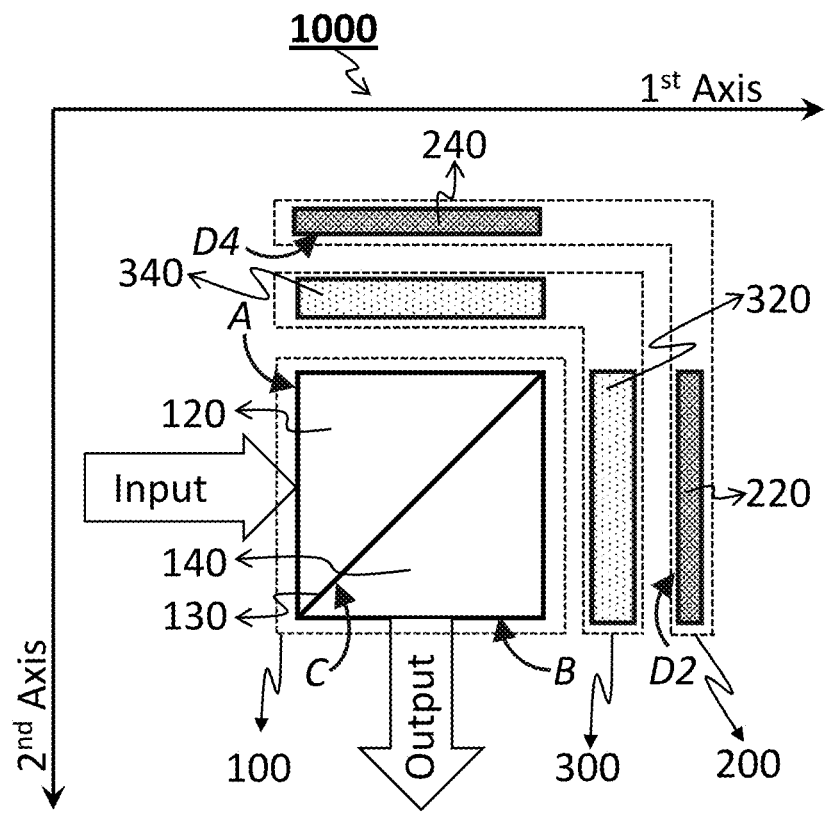

The structural diagram of the beam modulation apparatus 1000 shown in FIG. 1A is further illustrated in FIG. 1B. As shown, in the apparatus 1000, the PBS prism 100 includes two right-angle prisms (i.e. triangular prisms) 120 and 140, which are attached against each other on their respective bases (i.e. hypotenuses) to thereby form a PBS cube. Optionally, the two prisms 120 and 140 are glued or cemented together by arranging a thin film of a optical glue/cement material (e.g. epoxy) at an interface C between the two prisms 120 and 140. Optionally, the two prisms 120 and 140 can be arranged together without using a glue or cement.

The PBS cube 100 is provided with an optical incident surface A and an optical exit surface B, and the input light field is configured to enter into the PBS cube 100 through the optical incident surface A along a first axis, and the output light field is configured to exit the PBS cube 100 through the optical exit surface B along a second axis that is orthogonal to the first axis (i.e. substantially 90°). Both the first axis and the second axis have substantially 45° relative to the interface C.

The interface C of the PBS prism 100 is configured to selectively allow a P-polarized incoming light to transmit therethrough and an S-polarized incoming light to reflect thereby. For this purpose, a polarizing means 130 can be sandwiched at the interface C to make it a polarizing surface for the PBS cube 100. Optionally, the polarizing means 130 can comprise a polarizing spectroscopic film or a wire grid. In one example, the polarizing spectroscopic film can include a dielectric beamsplitter coating, which can be coated on the hypotenuse surface of one or both of the triangular prisms 120 and 140 before they are cemented together with a optical cement. Depending on the applications, the PBS prism can be configured to have a different extinction ratio for the transmitted beam $(T_p:T_s)$. For example, in applications such as in a TV projection system or an VR/AR display system, the PBS prism 100 in the beam modulation apparatus 1000 can have an extinction ratio of at least 500:1, or more preferably at least 1000:1.

As illustrated in FIG. 1B, the LCOS assembly 200 includes two LCOS panels. A first LCOS panel 220 is arranged over a first side surface of the PBS prism 100 that is opposing to the optical incident surface A, configured to have its reflective surface D2 facing the PBS prism 100 and in parallel to the first side surface such that an incoming beam from the PBS prism 100 can be reflected back to the PBS prism 100 along the first axis. A second LCOS panel 240 is arranged over a second side surface of the PBS prism that is opposing to the optical exit surface B, configured to have its reflective surface D4 facing the PBS prism 100 and in parallel to the first side surface such that an incoming beam from the PBS prism 100 can be reflected back to the PBS prism 100 along the second axis.

Each of the first LCOS panel 220 and the second LCOS panel 240 comprises a plurality of pixels over the respective reflective surface thereof, wherein each of the plurality of pixels is configured to be controllably switched on or off such that the polarization state of a light beam reflected by a portion of the reflective surface corresponding thereto is changed or remains unchanged.

Figure 2A:
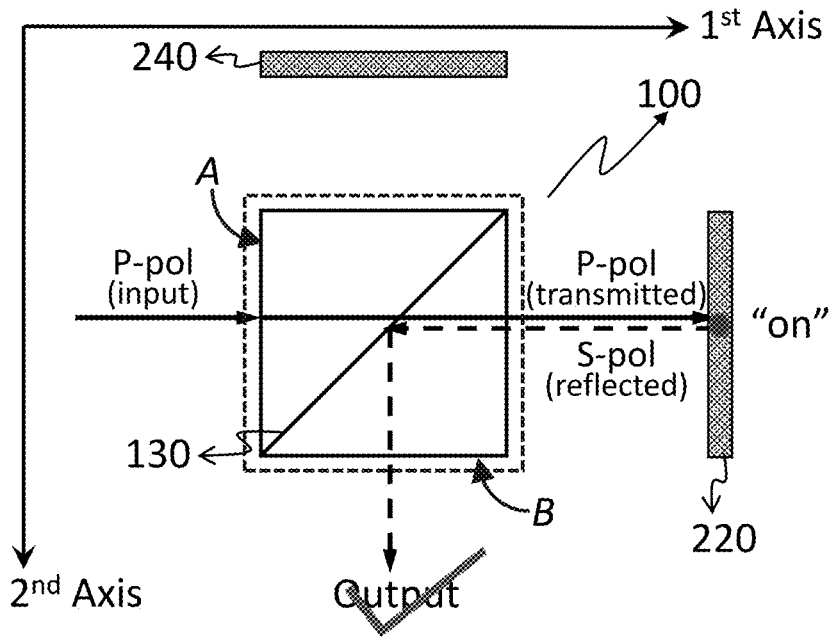
FIGS. 2A and 2B respectively illustrate the optical paths within the beam modulation apparatus upon a P-polarized light beam entering into the PBS prism of the beam modulation apparatus in situations where a pixel on the first LCOS panel is at the "on" state (FIG. 2A) and at the "off" state (FIG. 2B)
Figure 2B:
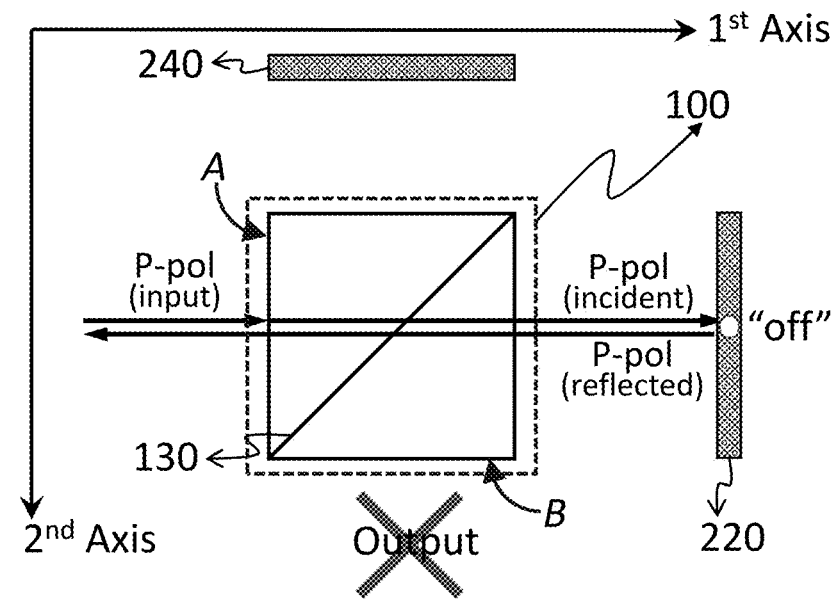

FIGS. 2A and 2B illustrate the optical paths of a P-polarized light beam within the input light field ("P-pol (input)") that enters through the optical incident surface A into the PBS cube 100, transmits through the polarizing interface C, and sheds onto the first LCOS panel 220 at a region corresponding to one particular pixel thereon when the pixel is at the "on" state (the filled circle in FIG. 2A) or at the "off" state (the empty circle in FIG. 2B), where straight lines with arrow heads and broken lines with arrow heads refer to P-polarized light beams and S-polarized light beams respectively. If the pixel is switched on, as shown in FIG. 2A, the incident P-polarized light beam ("P-pol (incident)") gets reflected back to give rise to a reflected S-polarized light beam ("S-pol (reflected)"), which enters into the PBS cube 100, and upon reaching the polarizing interface C, gets reflected thereby to exit out of the PBS cube 100 through the optical exit surface B for output. If the pixel is switched off, as illustrated in FIG. 2B, the incident P-polarized light beam ("P-pol (incident)") gets reflected back by the first LCOS panel 220 to give rise to a reflected P-polarized light beam ("P-pol (reflected)"), which enters into the PBS cube 100, and upon reaching the polarizing interface C, gets transmitted therethrough to exit out of the PBS cube 100 through the optical incident surface A to thus get lost without being outputted from the optical exit surface B. As such, by controlling the state of the pixel on the first LCOS panel 220, the input P-polarized light beam can be manipulated to be outputted (as a S-polarized light beam) or lost from the optical exit surface B of the prism cube 100.

Figure 2C:
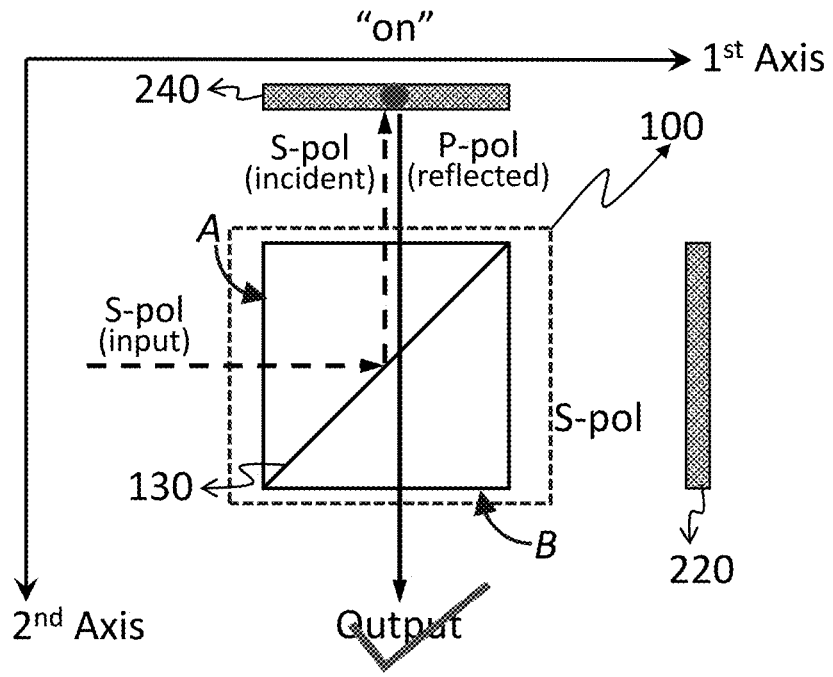
FIGS. 2C and 2D respectively illustrate the optical paths within the beam modulation apparatus upon an S-polarized light beam entering into the PBS prism of the beam modulation apparatus in situations where a pixel on the second LCOS panel is at the "on" state (FIG. 2C) and at the "off" state (FIG. 2D)
Figure 2D:
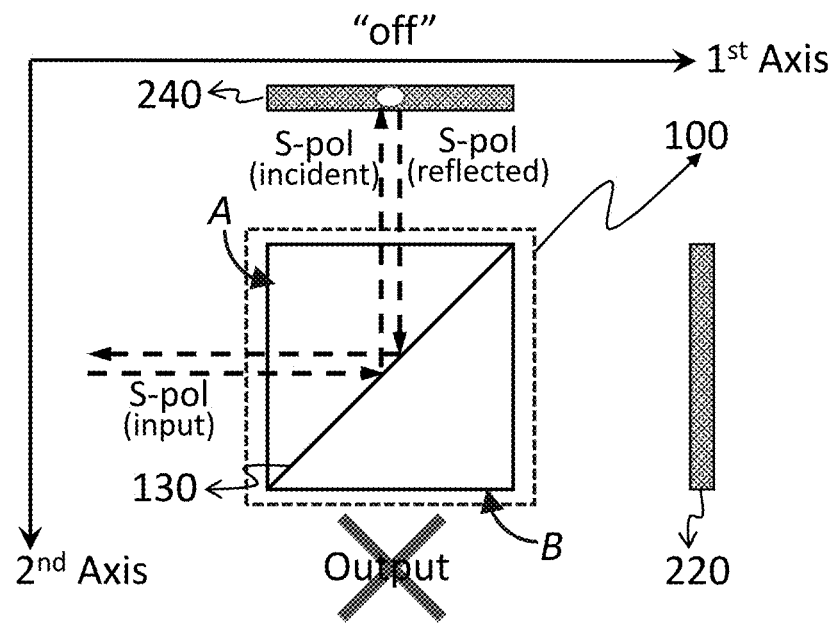

FIGS. 2C and 2D illustrate the optical paths of a S-polarized light beam within the input light field ("S-pol (input)") that enters through the optical incident surface A into the PBS cube 100, gets reflected at the polarizing interface C, and sheds onto the second LCOS panel 240 at a region corresponding to one particular pixel thereon when the pixel is at the "on" state (the filled circle in FIG. 2C) or at the "off" state (the empty circle in FIG. 2D), where straight lines with arrow heads and broken lines with arrow heads refer to P-polarized light beams and S-polarized light beams respectively. If the pixel is switched on, as shown in FIG. 2C, the incident S-polarized light beam ("S-pol (incident)") gets reflected back by the second LCOS panel 240 to give rise to a reflected P-polarized light beam ("P-pol (reflected)"), which enters into the PBS cube 100, and upon reaching the polarizing interface C, gets transmitted therethrough to exit out of the PBS cube 100 through the optical exit surface B for output. If the pixel is switched off, as illustrated in FIG. 2D, the incident S-polarized light beam ("S-pol (incident)") gets reflected back by the second LCOS panel 240 to give rise to a reflected S-polarized light beam ("S-pol (reflected)"), which enters into the PBS cube 100, and upon reaching the polarizing interface C, gets reflected again to exit out of the PBS cube 100 through the optical incident surface A to thus get lost without being outputted from the optical exit surface B. As such, by controlling the state of the pixel on the second LCOS panel 240, the input S-polarized light beam can be manipulated to be outputted (as a P-polarized light beam) or lost from the optical exit surface B.

It is noted that FIGS. 2A and 2B, and FIGS. 2C and 2D only exhibit two extreme states of the pixel (i.e. "on" and "off") on the first LCOS panel 220 and the second LCOS panel 240, respectively. It is possible that for a pixel on a particular LCOS panel, it is manipulated to allow partial polarity (or polarization state) conversion of the incident light beam, i.e. polarization rotation at an angle 0°<α<90°, and thus the reflected light beam is substantially a mix of a P-polarized light beam and S-polarized beam. Depending on where the reflected light beam is from, only a corresponding light beam can realize an output from the optical exit surface B of the PBS prism 100, which is only a fraction, but not all, of the light beam.

It is additionally noted that the above two pixel-controlled manipulations on the input P-polarized light beam and on the input S-polarized light beam in the input light field can be simultaneously and synchronizingly performed to realize the controlled spatial coupling of the two outputted light beams to give rise to a coloured pixel with different pitches on the display screen.

It is further noted that each of the first LCOS panel 220 and the second LCOS panel 240 contains a plurality of pixels (i.e. the plurality of first pixels and the plurality of second pixels) whose states can be individually controlled by means of a controlling circuit (not shown), such as a CMOS chip or another chip, that is assembled together with the LCOS panels, which is configured to receive instructions from a processor based on a pre-determined program. As such, a coloured image can be generated on a display screen based on the output light field that is outputted from the beam modulation apparatus as disclosed herein which is substantially a combination of a plurality of outputted light beams corresponding to the plurality of first and second pixels respectively on the first and second LCOS panels.

As further illustrated in FIG. 1B, a quarter-wave plate assembly 300 comprising two quarter-wave plates (i.e. a first quarter-wave plate 320 and a second quarter-wave plate 340) can be arranged in the beam modulation apparatus 1000. The first quarter-wave plate 320 is sandwiched between the PBS prism 100 and the first LCOS panel 220 along the first axis, and the second quarter-wave plate 340 is sandwiched between the PBS prism 100 and the second LCOS panel 240 along the second axis. It is noted that they are optional, and it is possible that none, or only one of the two quarter-wave plates, is arranged in the beam modulation apparatus 1000.

In the beam modulation apparatus 1000, an anti-reflection or anti-reflective (AR) coating or film can be optionally provided on one or more of the optical incident surface A, the optical exit surface B, the first side surface, or the second side surface of the PBS prism 100 so as to reduce the Fresnel reflections thereon.

In a second aspect, a projection system is further provided, which includes a beam modulation apparatus as described above.

Figure 3:
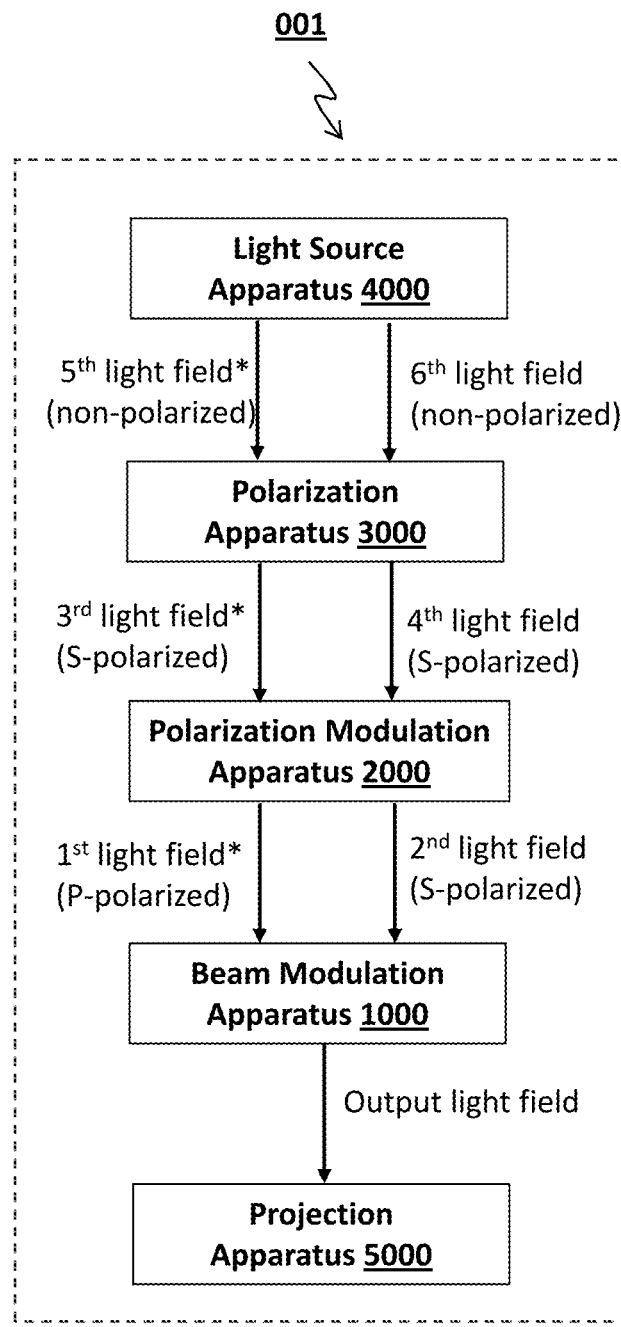
FIG. 3 illustrates a block diagram of a projection system according to some embodiments of the disclosure.

FIG. 3 illustrates a block diagram of a projection system according to some embodiments of the disclosure. As illustrated, the projection system 001 comprises a light source apparatus 4000, a polarization apparatus 3000, a polarization modulation apparatus 2000, a beam modulation apparatus 1000, and a projection apparatus 5000, which are optically coupled sequentially in the optical path.

Among those, the beam modulation apparatus 1000 can be based on any one of the embodiments of the beam modulation apparatus as described above in the first aspect. Following the configuration scheme as described above, the beam modulation apparatus 1000 is configured to modulate an input light field comprising a first light field and a second light field with different linear polarization states (i.e. an S-polarized and a P-polarized) to thereby provide an output light field to the projection apparatus 5000 for projection.

Upstream the optical path, the first light field and the second light field inputted to the beam modulation apparatus 1000 can be provided by the polarization modulation apparatus 2000, which is configured, upon receiving a third light field and a fourth light field having a substantially same polarization state, to modulate a polarization state of one, but not another, of the third light field and the fourth light field to correspondingly output, and then to provide to the beam modulation apparatus 1000, the first light field and the second light field respectively. In one example illustrated in FIG. 3, the third light field and the fourth light field inputted to the polarization modulation apparatus 2000 are both be S-polarized, and by means of the polarization modulation apparatus 2000, the S-polarized third light field is modulated to become P-polarized first light field, and the S-polarized fourth light field becomes S-polarized second light field. Other embodiments, where the third and fourth light fields inputted to the polarization modulation apparatus 2000 are both P-polarized, or the outputted first and second light fields are respectively S- and P-polarized, are also possible but not shown. More specifically, the polarization modulation apparatus 2000 can be configured to rotate a linear polarization axis of the one of the third light field and the fourth light field by 90°, and can optionally comprise a Faraday rotator, a Birefringent rotator, or a prism rotator. For example, the polarization modulation apparatus 2000 can comprise a half-wave plate, which is substantially a Birefringent rotator.

Further upstream, the third light field and the fourth light field inputted to the polarization modulation apparatus 2000 can be provided by the polarization apparatus 3000, which is configured to polarize a non-polarized fifth light field and a non-polarized sixth light field incident thereinto to correspondingly output, and thereby to provide to the polarization modulation apparatus 2000, the third light field and the fourth light field respectively, both having a substantially same polarization state. In a specific embodiment, the polarization apparatus comprises a front fly-eye lens, a rear fly-eye lens, and a PCS polarizing array of prisms. The front fly-eye lens is configured to optically divide each of the fifth light field and the sixth light field into a plurality of beams; the rear fly-eye lens is configured to focus the plurality of beams on a rear surface thereof; and the PCS polarizing array of prisms is configured to polarize the focused plurality of beams outputted from the rear fly-eye lens to obtain the third light field and the fourth light field. More details are provided below with the specific Embodiment 1.

Further upstream, the non-polarized fifth light field and the non-polarized sixth light field inputted to the polarization apparatus 3000 are provided by a light source apparatus 4000.

Each of the fifth light field and the sixth light field can comprise a single light beam, yet according to some preferred embodiments of the projection system, each pair of the fifth light field and the sixth light field, the third light field and the fourth light field, and the first light field and the second light field is a composite white light field formed by spatially coupling two light field in each pair, such that the projection system can be applied in a TV projection system or a VR/AR display system, to project colored images. For this purpose, in each pair of the light fields in each composite white light field, one light field is configured to be a time-sharing coupling light field comprising a first primary colour light and a second primary colour light (i.e. the first primary colour light and the second primary colour light are temporally coupled with each other in a time-sharing manner), and the other light field is configured to comprise a third primary colour light. In the illustrating example in FIG. 3, the fifth light field, and correspondingly the third light field, and the first light field are each configured to be a time-sharing coupling light field (labelled by * in the figure) comprising a first primary colour light and a second primary colour light coupled with each other in a time-sharing manner. The sixth light field, and correspondingly the fourth light field, and the second light field each comprise a third primary colour light.

According to some embodiments, the first primary colour light can be a blue light (B), and the second primary colour light and the third primary colour light are respectively a green light (G) and a red light (R), or are respectively a red light (R) and a green light (G).

In line with these above schemes, the light source apparatus 4000 is configured to emit the first primary colour light (i.e. blue light), and is further configured to obtain each of the second primary colour light (i.e. green light) and the third primary colour light (i.e. red light) by excitation on a corresponding fluorescence material (i.e. dye) by the first primary colour light (i.e. blue light).

Figure 4A:
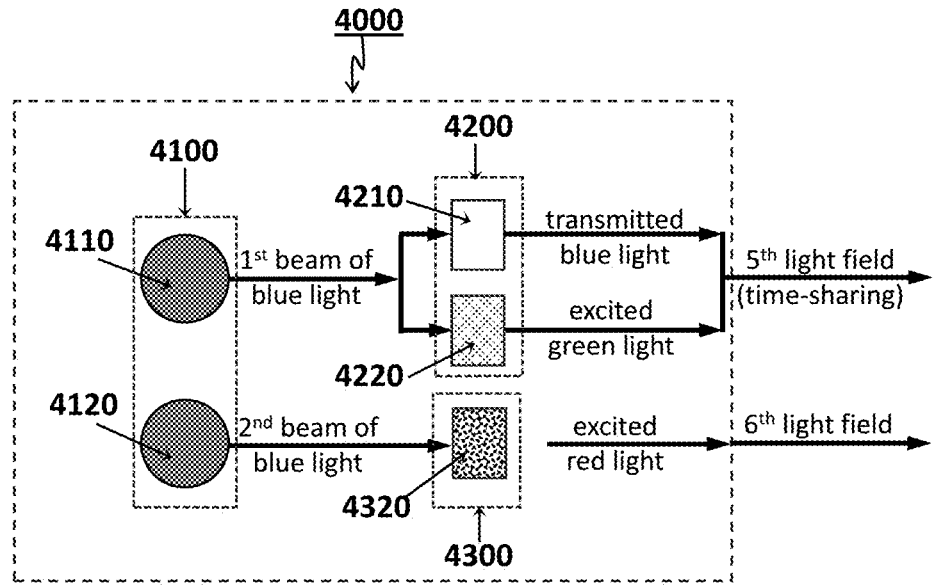
FIGS. 4A and 4B respectively illustrate the optical paths and schemes in the light source apparatus according to two different embodiments of the disclosure.

In one specific embodiment that will also be described in detail below in Embodiment 1, the light source apparatus 4000 includes a light source module 4100 comprising a first light source sub-module 4110 and a second light source sub-module 4120, configured to respectively emit a first beam of the first primary colour light and a second beam of the first primary colour light (e.g. two beams of blue light), as illustrated in FIG. 4A. The light source apparatus 4000 further includes a first fluorescence plate 4200 and a second fluorescence plate 4300, which are optically aligned with, and configured to respectively receive, the first beam of the first primary colour light and the second beam of the first primary colour light.

The first fluorescence plate 4200 comprises a transmission zone 4210 and a first fluorescence zone 4220 on a surface thereof facing the first beam of the first primary colour light. The first fluorescence zone 4220 comprises a first fluorescence material (i.e. dye #1) capable of generating the second primary colour light upon excitation by the first primary colour light. The first fluorescence plate 4200 is further configured to have the transmission zone 4210 and the first fluorescence zone 4220 to alternately face the first beam of the first primary colour light in a predetermined manner (e.g. scheduled durations in one cycle), such that when the first beam of first primary colour light transmitted through the transmission zone (i.e. the transmitted first primary colour light) is spatially combined optically with a beam of second primary colour light generated on the first fluorescence zone (i.e. the excitedly generated second primary colour light, e.g. green light in FIG. 4A), e.g. by modulating the optical paths for the transmitted first primary colour light and for the excited second primary colour light, a time-sharing coupled light field forms to thereby give rise to the fifth light field. The second fluorescence plate 4300 contains a second fluorescence zone 4320, which comprises a second fluorescence material (i.e. dye #2) on a surface thereof facing the second beam of the first primary colour light, configured such that upon excitation by the second beam of the first primary colour light, a beam of the third primary colour light (e.g. excited red light in FIG. 4A) is generated on the second fluorescence zone 4320 to thereby obtain the sixth light field.

Herein, optionally the first fluorescence plate 4200 can be in a form of a spinning wheel (i.e. colour wheel), with each of the transmission zone and the first fluorescence zone arranged in a fan-shaped area thereon. An angle of the transmission zone and an angle of the first fluorescence zone can optionally be configured to be complementary (i.e. having a sum of 360°). For example, they can be approximately between 89°-91° and approximately 269°-271°, respectively, and preferably can be approximately 90° and approximately 270°. Furthermore, the spinning wheel can have a spinning rate of at least 7,200 rpm, so as to realize the alternate acquisitions of the first primary colour light and the second primary colour light for the generation of the time-sharing coupled light field (i.e. the fifth light field). Optionally, the second fluorescence plate 4300 can also be in a form of a spinning wheel.

In order to realize the spatial combination of the optical paths for the transmitted first primary colour light and for the excited second primary colour light, the light source apparatus can further include a set of reflectors, which are arranged such that an optical path of the first beam of first primary colour light transmitted through the transmission zone is redirected to optically combine with an optical path of the beam of second primary colour light to thereby give rise to the fifth light field.

In any of the embodiments of the light source apparatus, each of the first light source sub-module and the second light source sub-module in the light source module can comprise a laser diode array. The light source module can further comprise a first collimating lens array and a second collimating lens array, which are arranged over a light-emitting surface of the first light source sub-module and the second light source sub-module respectively. Sub-eyes in each of the first collimating lens array and the second collimating lens array are arranged to correspondingly align with laser diodes in the laser diode array of a corresponding light source sub-module. Furthermore, each sub-eye comprises a hyperbolic aspheric lens, having a curved surface expressed as:

$$z = \frac{c_x x^2 + c_y y^2}{1 + \sqrt{1 - (1+k_x)c_x^2 x^2 - (1+k_y)c_y^2 y^2}};$$

Herein $C_x$ is a curvature of the hyperbolic aspheric lens in an x-direction, $C_y$ is a curvature of the hyperbolic aspheric lens in a y-direction, $K_x$ is a conic coefficient of the hyperbolic aspheric lens in the x-direction, and $K_y$ is the conic coefficient of the hyperbolic aspheric lens in the y-direction.

The light source apparatus can further comprise a first dichroic filter and a second dichroic filter, which are arranged over a light-emitting surface of the first light source sub-module and the second light source sub-module respectively and are configured to filter each of the first beam of the primary colour light and the second beam of the primary colour light respectively.

It can be further configured such that a far field of the first primary color light is in a Gaussian distribution, and as such, the light source apparatus further comprises a first diffusion plate and a second diffusion plate, which are respectively arranged between the first light source sub-module and the first dichroic filter and between the second light source sub-module and the second dichroic filter. The first diffusion plate and the second diffusion plate are configured to diffuse the first beam of the first primary colour light and the second beam of the first primary colour light, such that a far field thereof is expanded to have a bi-directional flat top like distribution. Furthermore, each of the first diffusion plate and the second diffusion plate can be optionally configured to have two-way diffusion characteristics, having a diffusion half angle of approximately 1.2°-1.8° in a horizontal direction and of approximately 0.65°-1.05° in a pitch direction. In a preferred embodiment, the diffusion half angles of the first diffusion plate and of the first diffusion plate can both be approximately 1.5° in the horizontal direction and approximately 0.85° in the pitch direction.

In order to eliminate a speckle of a light field formed by the first primary colour light as much as possible, the light source apparatus can further include one or more of the following means: (1) the transmission zone comprising a fan-shaped diffusion plate; (2) a collimation lens module arranged over a light-emitting surface of the first fluorescence plate; and (3) a collimation compensation lens and a third diffusion plate arranged on an optical path of the first beam of first primary colour light, and the third diffusion plate is configured to have a continuously small movement. More specifically, the third diffusion plate can be mechanically coupled (i.e. connected) with a vibration motor, which is configured to have vibration frequency between 100 Hz and 300 Hz, and the third diffusion plate can have a diffusion half angle between 2° and 3°.

The light source apparatus can further include a first focusing lens module and a second focusing lens module, which are respectively arranged between the first dichroic filter and the first fluorescence plate and between the second dichroic filter and the second fluorescence plate. Each of the first focusing lens module and the second focusing lens module comprises, along a light transmission direction, a first focusing lens sub-module and a second focusing lens sub-module, respectively comprising an aspheric lens and a spherical lens. Optionally, an aspheric surface of the aspheric lens can be expressed as:

$$z = \frac{c\rho^2}{1 + \sqrt{1 - (1+k)\ c^2 \rho^2}} + \Sigma A_n \rho^{2n};$$

Herein c is a curvature at a sphere vertex, k is a coefficient of an aspherical surface of a quadratic term, An is a coefficient of the aspherical surface of a higher-order term, n is taken as 2-7, and ρ is a normalized radial coordinate.

In the above embodiments, the first primary colour light is a blue light (B), and the second primary colour light and the third primary colour light are respectively a green light (G) and a red light (R), or are respectively a red light (R) and a green light (G). Furthermore, the generation of both the second and third primary colour lights relies on the excitation of a corresponding dye material by the first primary colour light. However, it should be noted that these configurations only represent illustrating examples, and shall not be deemed to limit the scope of the present disclosure. Other embodiments are also possible.

Figure 4B:
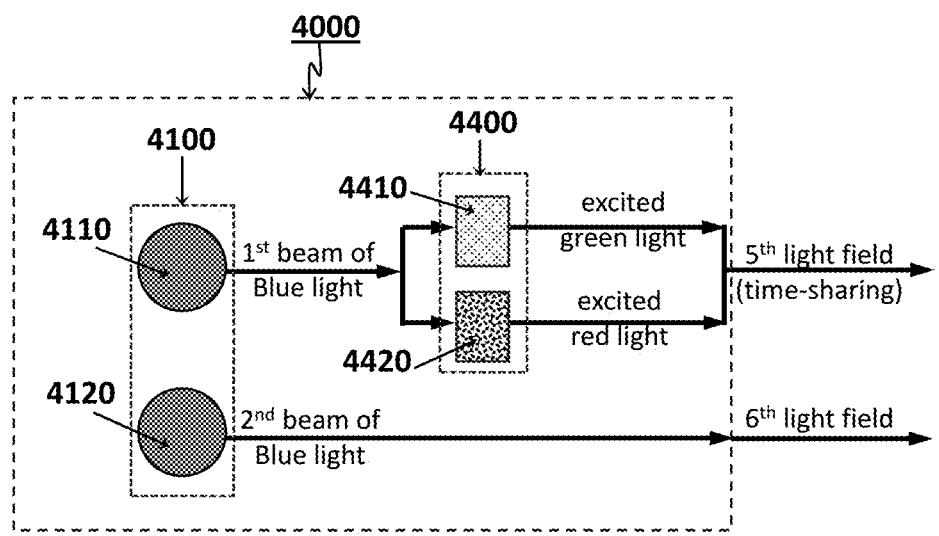

For example, in another embodiment as illustrated in FIG. 4B, the light source apparatus 4000 is configured to separately emit two beams of the third primary colour light (e.g. a first beam of blue light and a second beam of blue light as illustrated in FIG. 4B) by means of the first and second light source sub-module 4110 and 4120 respectively. A third fluorescence plate 4400 (e.g. a spinning colour wheel) having a third fluorescence zone 4410 (comprising dye #1) and a fourth fluorescence zone 4420 (comprising dye #2) on a surface thereof facing the first beam of blue light is configured to alternately generate a beam of the first primary colour light (i.e. excited green light) and a beam of the second primary colour light (i.e. excited red light) upon excitation by the first beam of the third primary colour light (i.e. blue light). The beam of the first primary colour light and the beam of the second primary colour light that are alternately generated by the third fluorescence plate 4400 can be managed to be coupled and outputted as the time-sharing coupled fifth light field. The second beam of the third primary colour light (i.e. blue light) emitted by the second light source sub-module 4120 directly provides the sixth light field. This embodiment of the light source apparatus 4000 has a relatively simpler structure.

In yet another example, the light source apparatus 4000 can be configured to emit the first primary colour light (e.g. by means of the first light source sub-module) and the second primary colour light (e.g. by means of the second light source sub-module), and is further configured to obtain the third primary colour light by excitation on a corresponding fluorescence material by the first primary colour light or the second primary colour light. In one such specific embodiment, the first, second, and third primary colour lights are respectively a blue light (B), a green light (G), and a red light (G), and the light source apparatus is configured to separately emit the blue light and the green light, and is further configured to obtain the red light by excitation on a corresponding fluorescence material by the emitted green light. As such, the outputted fifth light field comprises time-sharing coupled blue light and green light, and the outputted sixth light field comprises the red light.

In the following, one specific embodiment (i.e. Embodiment 1) of a laser television projection system is provided as an illustrating example.

Figure 5:
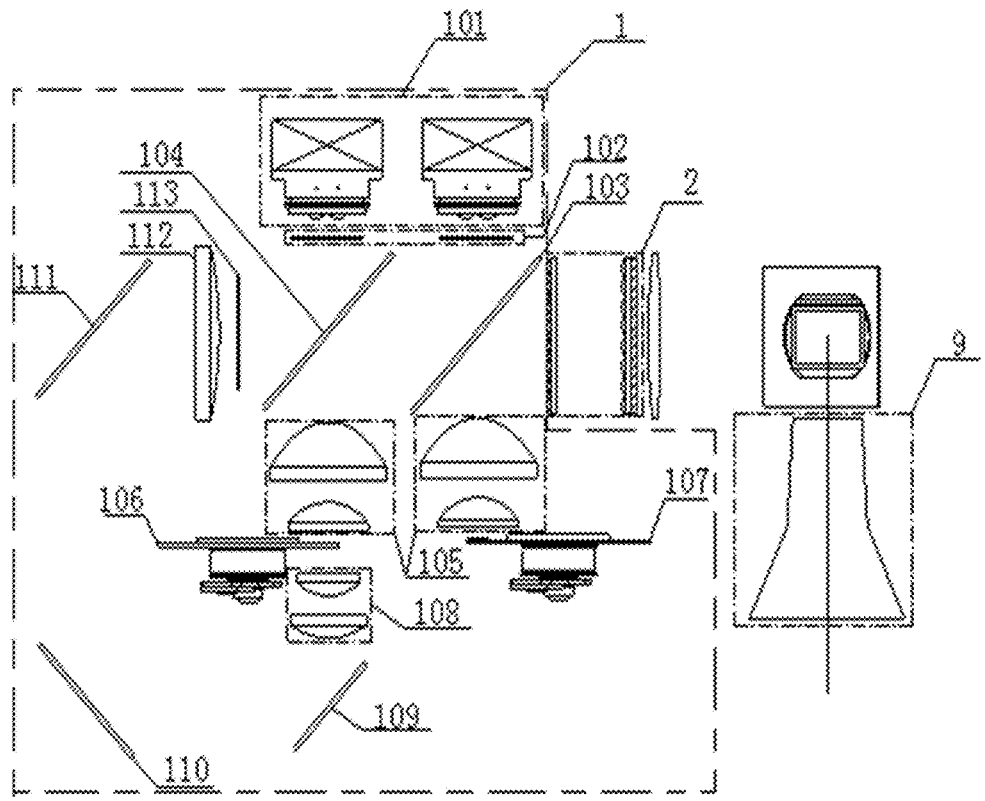
FIG. 5 illustrates a front view of a schematic structure of a laser television projection system according to one specific embodiment of the disclosure.
Figure 6:
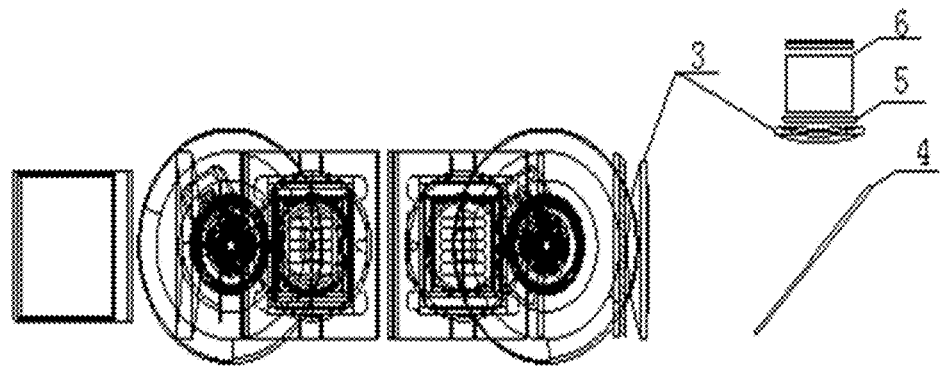
FIG. 6 illustrates a bottom view of the laser television projection system shown in FIG. 5.

FIGS. 5 and 6 respectively illustrate a front view and a bottom view of a laser television projection system shown in schematic diagrams according to one specific embodiment of the disclosure.

As shown, this specific embodiment of the laser television projection system includes a projection light source module 1, a homogenization and polarization module 2, a half-wave plate 5, a PBS prism 6, an LCOS light valve assembly 8, and a projection lens 9.

The projection light source module 1 is configured to provide a first white light field. The first white light field is substantially a coupled light field which comprises a first primary color light, a second primary color light, and a third primary color light. It is further configured such that the first primary color light is time-sharing coupled with the second primary color light to first obtain a time-sharing coupled light field, and the time-sharing coupled light field is further spatially coupled with the third primary color light to thereby obtain the first white light field.

The homogenization and polarization module 2 is configured to polarize the first white light field to thereby obtain a second white light field. In the second white light field, each light is a polarized light with a preset type, and the preset-type polarized light is one of a P-polarized light or an S-polarized light.

The half-wave plate 5 is configured to phase convert one of the time-sharing coupling light field in the second white light field or the third primary color light to thereby obtain a third white light field. The third white light field includes a P-polarized light and an S-polarized light.

The PBS prism 6 is configured to transmit the P-polarized light in the third white light field, and to reflect the S-polarized light in the third white light field. A first reflected light field obtained by the first LCOS light valve after transmission of the P-polarized light and the second reflected light field obtained by the second LCOS light valve after reflection of the S-polarized light are transmitted through the PBS prism 6 before shedding into the projection lens 9.

The LCOS light valve assembly 8 includes a first LCOS light valve and a second LCOS light valve.

In the specific laser television projection system as illustrated in FIGS. 5 and 6, through the combination of the homogenization and polarizing module 2 and the half-wave plate 5, the polarization direction of the time-sharing coupling light field and the polarization direction of the third primary color light in the third white light field are configured to have a difference of 90°. Further through the PBS prism 6, the time-sharing coupling light field and the third primary color light are respectively transmitted to their corresponding light valves (i.e. the first LCOS light valve and the second LCOS light valve) in the LCOS light valve assembly 8. As such, the issue of using too many lens elements in a laser television projection system having the conventional three-piece light valve structure due to the split folding of the relay optical path and other factors can be avoided. The reduced use of lens elements can shorten the back intercept of the projection lens 9, and can effectively reduce the thickness of the existing laser television projection system, leading to a decreased overall shape and reduced cost. Through the use of the double LCOS light valve architecture, the display brightness and the picture quality can be improved, thereby meeting the demand for high resolution and ultra short focal projection.

In this specific embodiment of the laser television projection system, the projection lens 9 adopts a UST projection lens, and more specifically, a 4K high-resolution ultra short focus projection lens. The projection lens 9 includes a positive focus lens group, a negative focus lens group, and a reflecting bowl. The projection lens 9 adopts an object telecentric design in a reflection form, the transmission ratio of the projection lens 9 is less than 0.25, the projection size of the projection lens 9 is between 80 and 120 inches, and the equivalent rear intercept of the projection lens 9 in the air is greater than 15.2 mm. It should be noted that other types of projection lens can also be used according to different embodiments of the disclosure.

With reference to FIG. 5 and FIG. 6, FIG. 5 is a front view of a laser television projection system provided by some embodiments of the disclosure, and FIG. 6 is a bottom view of a laser television projection system provided by some embodiments of the disclosure. The laser television projection system includes: a projection light source module 1, a homogenization and polarization module 2, a half-wave plate 5, a PBS prism 6, an LCOS light valve assembly 8, and a projection lens 9. The LCOS light valve assembly 8 includes a first LCOS light valve and a second LCOS light valve;

The projection light source module 1 is configured to provide a first white light field, and the first white light field is a coupled light field comprising a first primary color light, a second primary color light, and a third primary color light. The first primary color light is time-sharing coupled with the second primary color light to obtain a time-sharing coupled light field, and the time-sharing coupled light field is spatially coupled with the third primary color light to obtain the first white light field.

The homogenization and polarization module 2 is configured to polarize the first white light field to obtain a second white light field. In the second white light field, each light is a polarized light with a preset type, and the preset-type polarized light is one of a P-polarized light or an S-polarized light.

The half-wave plate 5 is configured to phase convert one of the time-sharing coupling light field in the second white light field or the third primary color light to obtain a third white light field. The third white light field includes a P-polarized light and an S-polarized light.

The PBS prism 6 is configured to transmit the P-polarized light in the third white light field, and to reflect the S-polarized light in the third white light field. A first reflected light field obtained by the first LCOS light valve after transmission of the P-polarized light and the second reflected light field obtained by the second LCOS light valve after reflection of the S-polarized light are transmitted through the PBS prism 6 before shedding into the projection lens 9.

In the laser television projection system as illustrated in FIGS. 5 and 6, through the combination of the homogenization and polarizing module 2 and the half-wave plate 5, the polarization direction of the time-sharing coupling light field and the polarization direction of the third primary color light in the third white light field will have a difference of 90°. Further through the PBS prism 6, the time-sharing coupling light field and the third primary color light are transmitted to the corresponding light valve. As such, the use of too many lens elements in the three-piece light valve structure because of the split folding of the relay optical path and other factors can be avoided. The reduced use of lens elements can shorten the back intercept of the projection lens 9, and effectively reduce the thickness of the existing laser television projection system, leading to a reduced overall shape and reduced cost. Through the use of the double LCOS light valve architecture, the display brightness and the picture quality can be improved, thereby meeting the demand for high resolution and ultra short focal projection.

Furthermore, in one embodiment of the disclosure, the projection lens 9 can adopt a UST projection lens, and more specifically, a 4K high-resolution ultra short focus projection lens. The projection lens 9 comprises a positive focus lens group, a negative focus lens group, and a reflecting bowl. The projection lens 9 adopts an object telecentric design in a reflection form, the transmission ratio of the projection lens 9 is less than 0.25, the projection size of the projection lens 9 is between 80 and 120 inches, and the equivalent rear intercept of the projection lens 9 in the air is greater than 15.2 mm.

In other embodiments, other types of projection lens can also be used. There is no limitation herein.

Furthermore, a quarter-wave plate 7 can be arranged between the LCOS light valve assembly 8 and the PBS prism 6, which can improve the picture contrast.

Specifically, a first quarter-wave plate 7 can be arranged between the first LCOS light valve and the PBS prism 6, and a second quarter-wave plate can be arranged between the second LCOS light valve and the PBS prism 6.

Specifically, the H-ZLAF52A material can be used for the PBS prism 6, which allows the polarization contrast of the PBS prism 6 to be greater than 1000:1, so as to improve the picture contrast.

Specifically, the PBS prism 6 can be formed by gluing two triangular prisms. The glued surface of each triangular prism is plated with a polarizing spectroscopic film. The S-polarized light is reflected at the polarizing spectroscopic film, and the P-polarized light is transmitted through the polarizing spectroscopic film.

Figure 7:
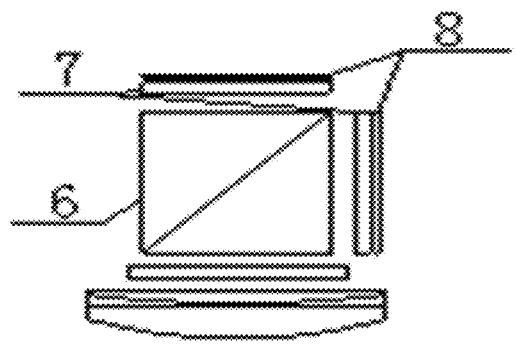
FIG. 7 shows a right view of the local structure in the embodiment of the laser television projection system shown in FIGS. 5 and 6.

Furthermore, with reference to FIG. 7, which shows a right view of the local structure (i.e. the assembled structure of the PBS prism 6 and the LCOS light valve assembly 8) in the embodiment of the laser television projection system shown in FIG. 6. One of the first LCOS light valve and the second LCOS light valve is arranged over the top of the PBS prism 6, and the other is arranged over a side of the PBS prism 6.

The projection lens 9, the PBS prism 6 and the second LCOS light valve are arranged in a same straight-line direction, and the PBS prism 6 is arranged between the projection lens 9 and the second LCOS light valve.

Specifically, the first LCOS light valve and the second LCOS light valve can have a size of approximately 0.55 inches, such that the size of the laser television projection system can be reduced.

Specifically, the P-polarized light in the third white light field transmits through the polarizing spectroscopic film of the PBS prism 6, and then is reflected back by the first LCOS light valve to thereby obtain the first reflected light field. The first reflected light field is an S-polarized light. The first reflected light field is reflected at the polarizing spectroscopic film of the PBS prism 6, and then transmits to the projection lens 9. The S-polarized light in the third white light field transmits to the polarizing spectroscopic film of the PBS prism 6. The second reflected light field is a P-polarized light, and the second reflected light field transmits through the polarizing spectroscopic film of the PBS prism 6, and then transmitted to the projection lens 9.

Furthermore, the first primary color light is a blue light, the second primary color light is a green light, and the third primary color light is a red light. Alternatively, the first primary color light is a blue light, the second primary color light is a red light, and the third primary color light is a green light.

Furthermore, the half-wave plate 5 can be a R (red) half-wave plate, a RB (red and blue) half-wave plate, a G (green) half-wave plate, or a GB (green and blue) half-wave plate.

The R half-wave plate is configured to rotate the polarization direction of the red light by 90°; the RB half-wave plate is configured to rotate the polarization directions of the red light and the blue light by 90°; the G half-wave plate is configured to rotate the polarization direction of the green light by 90°; and the GB half-wave plate is configured to rotate the polarization directions of the green light and the blue light by 90°

Specifically, if the first primary color light, the second primary color light, and the third primary color light are respectively a blue light, a green light, and a red light, the half-wave plate 5 can be a R half-wave plate or a GB half-wave plate, as long as the polarization directions of the time-sharing coupling light field and the third primary color light in the third white light field have a difference of 90°. If the first primary color light, the second primary color light, and the third primary color light are respectively a blue light, a red light, and a green light, the half-wave plate 5 can be a G half-wave plate or a RB half-wave plate, as long as the polarization directions of the time-sharing coupling light field and the third primary color light in the third white light field have a difference of 90°.

The homogenization and polarizing module 2 includes a front fly-eye lens, a rear fly-eye lens, and a PCS polarizing array prism. The first white light field is divided into a plurality of light arrays after passing through the front fly-eye lens, which are focused on the rear surface of the rear fly-eye lens. The PCS polarizing array prism polarizes the light field transmitted through the rear fly-eye lens to thereby obtain the second white light field.

Figure 8:
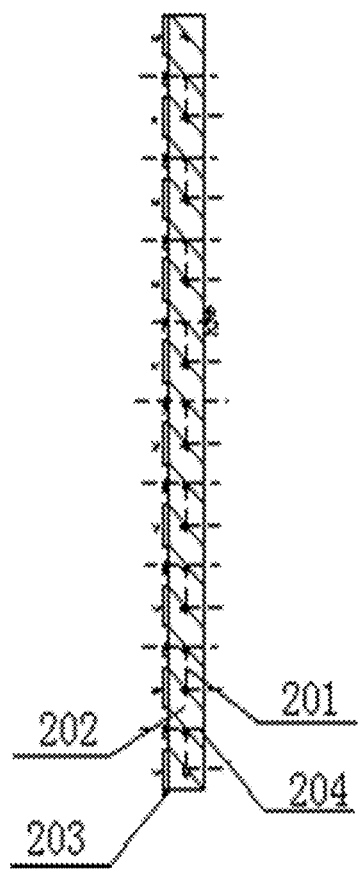
FIG. 8 shows a structural diagram of the PCS polarizing array prism in the embodiment of the laser television projection system.

Specifically, with reference to FIG. 8, it shows a structural diagram of the PCS polarizing array prism provided by the embodiment of the disclosure. The PCS polarizing array prism includes a first parallel square prism 201, a second parallel square prism 202, a metal plate 203 and a half-wave plate 204. There number of the first parallel square prism 201, the second parallel square prism 202, the metal plate 203 and the half-wave plate 204 is more than one. In a direction from bottom to top, it is arranged in a sequence of one first parallel square prism 201, one second parallel square prism 202, one first parallel square prism 201, one second parallel square prism 202 . . . The two ends of each first parallel square prism 201 and each second parallel square prism 202 are vertical faces. A polarizing spectroscopic film is arranged between each first parallel square prism 201 and its neighboring second parallel square prism 202. A metal plate 203 is arranged at a front end of each first parallel square prism 201 in a one-by-one corresponding manner. The light field transmitted through the rear fly-eye lens passes through a space between every two adjacent metal plates 203 to thereby enter into a second parallel square prism 202.

When a half-wave plate 204 is arranged at the back end of the first parallel square prism 201 and the half wave plate 204 corresponds to the first parallel square prism 201 in a one-by-one relationship, an S-polarized light in the first white light field is reflected by the polarizing spectroscopic film, and then sheds vertically at an adjacent polarizing spectroscopic film, where it is reflected to then horizontally shed at the back end of the second parallel square prism 202; whereas a P-polarized light in the first white light field is transmitted through the polarizating spectroscopic film, and then sheds at the back end of the first parallel square prism 201, and when passing through the half-wave plate 204, the polarization direction of it rotates by 90°. As such, the lights included in the second white light field are all S-polarized lights.

When a half-wave plate 204 is arranged at the back end of the second parallel square prism 202 and the half-wave plate 204 corresponds to the second parallel square prism 201 in a one-by-one relationship, a P-polarized light in the first white light field is transmitted through the polarizating spectroscopic film, and then sheds at the back end of the first parallel square prism 201; whereas an S-polarized light in the first white light field is reflected by the polarizing spectroscopic film, and then sheds vertically at an adjacent polarizing spectroscopic film and get reflected. When it horizontally transmits through the half-wave plate 204, the polarization direction rotates by 90°. As such, the lights included in the second white light field are all P-polarized lights.

A shaping lens module 3 and a folding mirror 4 are arranged between the homogenizing and polarizing module 2 and the half-wave plate 5.

The shaping lens module 3 includes a first lens and a second lens. After the second white light field transmitted through the homogenizing and polarizing module 2 passes through the first lens, it is reflected by the folding mirror 4 to shed to the second lens, and then passes through the second lens to the half-wave plate 5;

The shaping lens module 3, the front fly-eye lens, and the rear fly-eye lens are arranged in a manner that is required for forming a Kohler lighting system, so as to form a uniform lighting field on the exit pupil position of the shaping lens module.

In the laser television projection system provided by the embodiment of the disclosure, the first white light field is divided into a plurality of light arrays after passing through the front fly-eye lens, which are then focused on the rear surface of the rear fly-eye lens, and then pass through the space between adjacent metal plates 203. As such, the utilization ratio of the first white light field can be ensured, and the loss of the second white light field at the PCS polarizing array prism can be reduced. Furthermore, the horizontal position of each half wave plate 204 coincides with the horizontal position of the space between adjacent metal plates 203, which can better improve the utilization ratio of the first white light field and further reduce the loss of the second white light field at the PCS polarizing array prism.

Figure 9:
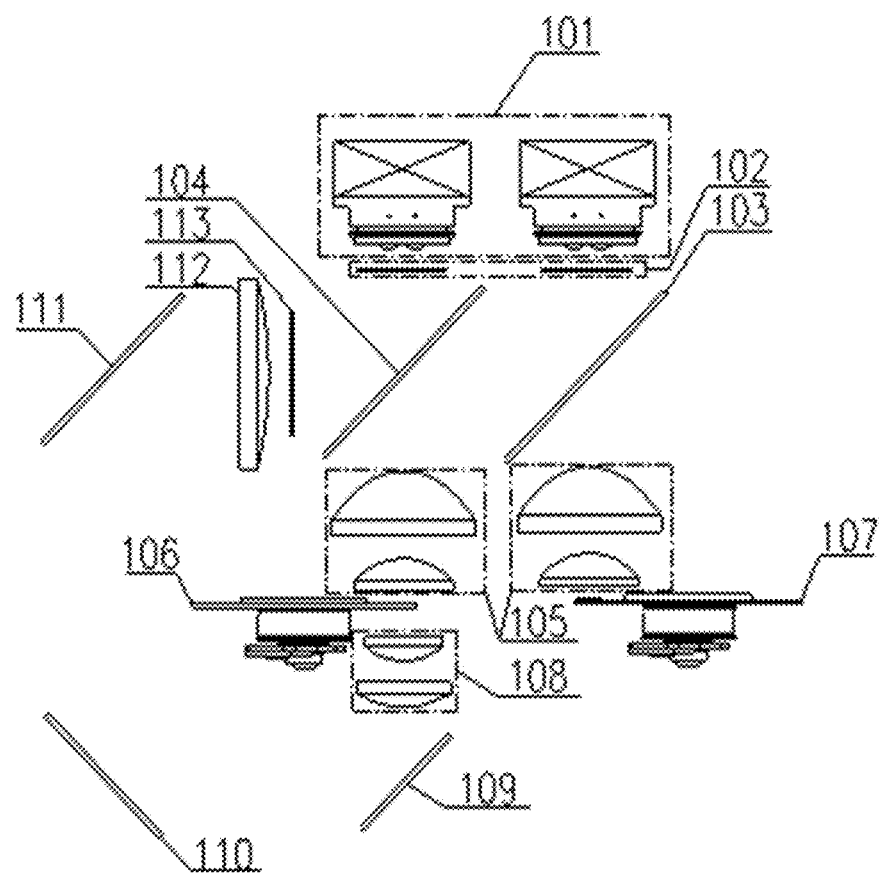
FIG. 9 shows a structural diagram of the projection light source in the embodiment of the laser television projection system.

Furthermore, in another embodiment of the disclosure illustrated in FIG. 9, the structural diagram of the projection light source module 1 according to the embodiment of the disclosure is diagramed. The projection light source module 1 includes: a light source module 101, a first dichroic filter 103, a second dichroic filter 104, a first fluorescence wheel (i.e. first colour wheel) 106, a second fluorescence wheel (i.e. second colour wheel) 107, a first reflector 109, a second reflector 110, and a third reflector 111.

The light source module 101 is configured to emit two parallel first primary color lights, one of which is directed to the first fluorescence wheel 106 and the other to the second fluorescence wheel 107.

The first fluorescence wheel 106 includes a transmission zone, a first fluorescence zone and a heat dissipation substrate that corresponds to the first fluorescence zone. The side of the heat dissipation substrate that is close to the first fluorescence zone is coated with a specular high-reflection film (or mirror-surface highly reflective surface or alike). The first primary color light passes through the second dichroic filter 104 that is arranged between the light source module 101 and the first fluorescence wheel 106, and then sheds to the first fluorescence wheel 106. When the first primary color light sheds on the first fluorescence zone, it is excited to thereby obtain the second primary color light. The second primary color light is reflected by the specular high-reflection film, and then sheds onto, and get reflected by, the second dichroic filter 104, so as to obtain a horizontal light field of the second primary color light. When the first primary color light sheds on the transmission zone, it is transmitted therethrough, and the first primary color light transmitted through the transmission zone is sequentially reflected by the first reflector 109, the second reflector 110, and the third reflector 111, so as to obtain a horizontal light field of the first primary color light.

After the horizontal light field of the first primary color light passes through the second dichroic filter 104, it is coupled with the horizontal light field of the second primary color light in a time-sharing manner to thereby obtain the time-sharing coupled light field.

The second fluorescence wheel 107 includes a second fluorescence zone and a heat dissipation substrate that corresponds to the second fluorescence zone. The side of the heat dissipation substrate that is close to the second fluorescence zone is coated with a specular high-reflection film (or mirror-surface highly reflective surface or alike). The first primary color light passes through the first dichroic filter 103 that is arranged between the light source module 101 and the second fluorescence wheel 107, and then sheds onto the second fluorescence zone of the second fluorescence wheel 107 to be excited to thereby obtain the third primary color light. The third primary color light is reflected by the specular high-reflection film, and then sheds onto, and get reflected by, the first dichroic filter 103, so as to obtain a horizontal light field of the third primary color light.

Specifically, the first fluorescence wheel 106 is provided with a motor and a controller, and the controller controls the motor to maintain the rotation speed of the first fluorescence wheel 106 at 7,200 rpm or 14,400 rpm; the second fluorescence wheel 107 is also provided with a motor and a controller, and the controller controls the motor to maintain the rotation speed of the second fluorescence wheel 107 at 7,200 rpm or 14,400 rpm.

Furthermore, the light source module 101 includes a first array laser light source sub-module and a second array laser light source sub-module, and the structures of the first array laser light source sub-module and of the second array laser light source sub-module are the same.

Each of the first array light source module and the second array light source module includes a laser diode array, a heat conducting copper plate, a heat conducting tube, a heat sink, a collimating lens array, a power supply, a control system, and a fan.

The laser diode array is evenly arranged on the heat conducting copper plate. The heat conducting tube is inserted in the heat conducting copper plate. The heat conducting tube contains refrigerant, and the other end of the heat conducting tube is connected with a heat sink. Under the action of the fan, the heat of the heat sink is taken away. The power source is a constant-current power source. The control system uses the mode of PWM (pulse width modulation) to control the amplitude of the current, to control the on-off status and the intensity of the current in the laser diode array, and to monitor the temperature of each target stripe of the laser diode array and the rotation speed of the fan. The collimating lens array is arranged at the front end of the laser diode array, and the sub-eyes on the lens surface of the collimating lens array are arranged to correspond to the laser diodes in the laser diode array in a one-by-one relationship.

Each sub-eye on the lens surface of the collimating lens array adopts a hyperbolic aspheric lens, and the hyperbolic equation of the curved surface of the hyperbolic aspheric lens is expressed as:

$$z = \frac{-c_x x^2 + c_y y^2}{1 + \sqrt{1 - (1+k_x)c_x^2 x^2 - (1+k_y)c_y^2 y^2}};$$

Herein, $C_x$ is the curvature of the hyperbolic aspheric lens in the x-direction, $C_y$ is the curvature of the hyperbolic aspheric lens in the y-direction, $K_x$ is the conic coefficient of the hyperbolic aspheric lens in the x-direction, and $K_y$ is the conic coefficient of the hyperbolic aspheric lens in the y-direction.

By adopting the sub-eye structure as mentioned above, the laser field can be collimated better and the beam divergence angle can be reduced.

Furthermore, the far field of the first primary color light is in a Gaussian distribution;

A diffusion plate 102 is arranged between the light source module 101 and the first dichroic filter 103 or the second dichroic filter 104, and the diffusion plate 102 includes a first diffusion plate and a second diffusion plate.

Correspondingly, the first diffusion plate is arranged between the first array light source module and the second dichroic filter 104, and the second diffusion plate is arranged between the second array light source module and the first dichroic filter 103;

The first diffusion plate and the second diffusion plate are configured to diffuse the first primary color light, so that the far field of the first primary color light can be expanded to have a bi-directional flat top like distribution.

Specifically, the first diffusion plate is configured to reflect the second primary color light in the light field that is excited returned (i.e. excited returned light field), and is also configured to filter the lights other than the second primary color light in the excited returned light field. The second diffusion plate is configured to reflect the third primary color light in the excited returned light field, and is also configured to filter the lights other than the third primary color light in the excited returned light field. As such. the requirements of white field color matching can be met.

Specifically, if the first fluorescence zone on the first fluorescence wheel 106 is provided with a green fluorescent plate, only lights with wavelengths of more than 500 nm are retained in the light field reflected by the second dichroic filter 104. If the second fluorescence zone on the second fluorescence wheel 107 is provided with a red fluorescent plate, only lights with wavelengths of more than 600 nm are retained in the light field reflected by the first dichroic filter 103.

The first diffusion plate and the second diffusion plate are configured to each have two-way diffusion characteristics, in which the diffusion half angle is controlled to be 1.2°-1.8° in the horizontal direction and 0.65°-1.05° in the pitch direction. Preferably, the diffusion half angle is approximately 1.5° in the horizontal direction and approximately 0.85° in the pitch direction.

Furthermore, a focusing lens module 105 is further included in the system, which includes a first focusing lens sub-module and a second focusing lens sub-module;

The first focusing lens sub-module is arranged between the first dichroic filter 103 and the second fluorescence wheel 107. The first focusing lens sub-module is configured to focus the first primary color light that is transmitted through the first dichroic filter 103 on the second fluorescence wheel 107 to thereby form a strip facula, and to collimate the third primary color light that is excited by the second fluorescence wheel 107 into a parallel light field, which then sheds to the first dichroic filter 103;

The second focusing lens sub-module is arranged between the second dichroic filter 104 and the first fluorescence wheel 106. The second focusing lens sub-module is configured to focus the first primary color light that is transmitted through the second dichroic filter 104 on the first fluorescence wheel 106 to thereby form a strip facula, and to collimate the second primary color light that is excited by the first fluorescence wheel 106 into a parallel light field, which then sheds to the second dichroic filter 104.

Furthermore, the structure of the first focusing lens sub-module and the structure of the second focusing lens sub-module are substantially the same. Each of the first focusing lens sub-module and the second focusing lens sub-module includes an aspheric lens and a spherical lens. The aspheric lens is arranged to be more closer to the light source module, and the spherical lens is arranged to be more closer to the first fluorescence wheel or the second fluorescence wheel.

The equation of the aspheric surface of the aspheric lens can be expressed as:

$$z = \frac{c\rho^2}{1 + \sqrt{1 - (1+k)c^2\rho^2}} + \Sigma A_n \rho^{2n};$$

Herein, c is the curvature at the sphere vertex, k is the coefficient of the aspherical surface of the quadratic term, $A_n$ is the coefficient of the aspherical surface of the higher-order term, n is taken as 2-7, and ρ is the normalized radial coordinate.

By use of the above-mentioned focusing lens module 105, the aberration can be reduced, leading to a better focusing effect, which is conducive to focusing on the first fluorescence wheel 106 and the second fluorescence wheel 107 to form a strip facula. The combined focal length f of the first focusing lens sub-module and the second focusing lens sub-module is controlled to be between 15 mm and 20 mm, and the maximum aperture is controlled to be within 32 mm.

Furthermore, the transmission zone can be provided with a fan-shaped diffusion plate, and a collimation lens module 108 is arranged between the first fluorescence wheel 106 and the first reflector 109, which can eliminate the speckle of the blue light field.

Specifically, the diffusion half angle of the fan-shaped diffusion plate is controlled to be between 3.5° and 6.5°.

A collimation compensation lens 112 and a third diffusion plate 113 are sequentially arranged between the third reflector 111 and the second dichroic filter 104. The third diffusion plate 113 is configured to move left and right, or up and down circularly. Specifically, the third diffusion plate 113 can be slightly shifted left and right or up and down by loading a vibration motor on the third diffusion plate 113, and the vibration frequency of the motor is controlled to be between 100 Hz and 300 Hz, which can eliminate the speckle of the blue light field.

Specifically, the diffusion half angle of the third diffusion plate 113 is controlled to be between 2° and 3°. Preferably, the diffusion half angle of the third diffusion plate 113 is approximately 2.5°.

Furthermore, the transmission zone is configured to have a fan-shaped structure (i.e. sector structure), and the first fluorescence zone is configured to have a fan-shaped ring structure. The angle of the transmission zone is 89°-91°, and the angle of the first fluorescence zone is 269°-271°. The angle of the transmission zone is configured to be complementary to the angle of the first fluorescence zone, which is conducive to the realization of white light color matching field. When the angle of the transmission zone is 90°, the angle of the first fluorescence zone is 270°, which can better meet the matching requirements.

The projection light source module for the laser television projection system provided by the embodiment of the disclosure realizes the time-sharing coupling of the first primary color light and the second primary color light to thereby obtain the time-sharing coupling light field, and further realizes the spatial coupling of the time-sharing coupling light field and the third primary color light to thereby obtain the first white light field. In addition, the double-route fluorescence wheel is used to realize RGB color matching, which can improve the display color gamut, and solve the issue of speckles in the pure laser display to thereby reproduce the objective world with rich and gorgeous colors. By simply folding the optical path, the system layout is compact, which can effectively reduce the thickness of the existing laser TV, reduce the overall shape, and reduce the cost.

The invention claimed is:

1. A projection system, comprising a beam modulation apparatus, a polarization modulation apparatus, a polarization apparatus, and a light source apparatus, wherein:
   the beam modulation apparatus is configured for modulating an input light field entering thereinto along a first axis so as to obtain an output light field exiting therefrom along a second axis orthogonal to the first axis, wherein the input light field comprises a first light field and a second light field, wherein one of the first light field and the second light field has an S-polarization state, and another of the first light field and the second light field has a P-polarization state, wherein the beam modulation apparatus comprises:
      a polarizing beam splitter (PBS) prism, comprising two right-angle prisms attached with each other on respective base surfaces thereof, arranged such that both the first axis and the second axis have substantially 45° relative to an interface between the two right-angle prisms, wherein the PBS prism is provided with an optical incident surface allowing the input light field to enter therethrough and an optical exit surface allowing the output light field to exit therefrom, and the interface of the PBS prism is configured to selectively allow a P-polarized incoming light to transmit therethrough and an S-polarized incoming light to reflect thereby; and
      a liquid crystal on silicon (LCOS) assembly, comprising a first LCOS panel and a second LCOS panel, wherein the first LOOS panel is over a first side surface of the PBS prism opposing to the optical incident surface, aligned such that a light incident thereon is reflected back towards the PBS prism along the first axis; the second LCOS panel is over a second side surface of the PBS prism opposing to the optical exit surface, aligned such that a light incident thereon is reflected back towards the PBS prism along the second axis; and each of the first LCOS panel and the second LCOS panel comprises a plurality of pixels over a reflective surface thereof, wherein each of the plurality of pixels is configured to be controllably switched on or off such that a polarity state of a light beam reflected by a portion of the reflective surface corresponding thereto is changed or remains unchanged;
   the polarization modulation apparatus is configured, upon receiving a third light field and a fourth light field having a substantially same polarization state, to modulate a polarization state of one, but not another, of the third light field and the fourth light field to correspondingly output the first light field and the second light field respectively;
   the polarization apparatus is configured to polarize a non-polarized fifth light field and a non-polarized sixth light field incident thereinto to correspondingly output the third light field and the fourth light field respectively; and
   the light source apparatus is configured to provide the fifth light field and the sixth light field, wherein the fifth light field and the sixth light field are configured to together form a white light field, wherein the fifth light field is a time-sharing coupling light field comprising a first primary colour light and a second primary colour light; and the sixth light field comprises a third primary colour light.

2. The projection system of claim 1, wherein the light source apparatus is configured to emit the first primary colour light, and is further configured to obtain each of the second primary colour light and the third primary colour light by excitation on a corresponding fluorescence material by the first primary colour light.

3. The projection system of claim 1, wherein the light source apparatus is configured to emit the first primary colour light and the second primary colour light, and is further configured to obtain the third primary colour light by excitation on a corresponding fluorescence material by the first primary colour light or the second primary colour light.

4. The projection system of claim 2, wherein the light source apparatus comprises:
   a light source module comprising a first light source sub-module and a second light source sub-module, configured to respectively emit a first beam of the first primary colour light and a second beam of the first primary colour light; and
   a first fluorescence plate and a second fluorescence plate, optically aligned with, and configured to receive, the first beam of the first primary colour light and the second beam of the first primary colour light respectively;
   wherein:
      the first fluorescence plate comprises a transmission zone and a first fluorescence zone on a surface thereof facing the first beam of the first primary colour light, wherein the first fluorescence zone comprises a first fluorescence material capable of generating the second primary colour light upon excitation by the first primary colour light, wherein the first fluorescence plate is further configured to have the transmission zone and the first fluorescence zone to alternately align with the first beam of the first primary colour light in a predetermined manner such that the first beam of the first primary colour light transmitted through the transmission zone and a beam of the second primary colour light generated from the first fluorescence zone are coupled in a time-sharing manner to be outputted as the fifth light field; and the second fluorescence plate comprises a second fluorescence zone comprising a second fluorescence material on a surface thereof facing the second beam of the first primary colour light, configured such that upon excitation by the second beam of the first primary colour light, a beam of the third primary colour light is generated from the second fluorescence zone to be outputted as the sixth light field.

5. The projection system of claim 4, wherein the first fluorescence plate is in a form of a spinning wheel, with each of the transmission zone and the first fluorescence zone arranged in a fan-shaped area on the spinning wheel, wherein an angle of the transmission zone and an angle of the first fluorescence zone are complementary, and are approximately between 89°-91° and approximately 269°-271°, respectively, and the spinning wheel has a spinning rate of at least 7,200 rpm.

6. The projection system of claim 4, wherein the light source apparatus further comprises a set of reflectors, arranged such that an optical path of the first beam of first primary colour light transmitted through the transmission zone is redirected to optically combine with an optical path of the beam of second primary colour light to thereby give rise to the fifth light field.

7. The projection system of claim 4, wherein in the light source module, each of the first light source sub-module and the second light source sub-module comprises a laser diode array, wherein the light source module further comprises a first collimating lens array and a second collimating lens array, arranged over a light-emitting surface of the first light source sub-module and the second light source sub-module respectively, wherein sub-eyes in each of the first collimating lens array and the second collimating lens array are arranged to correspondingly align with laser diodes in the laser diode array of a corresponding light source sub-module, wherein:

each sub-eye comprises a hyperbolic aspheric lens, having a curved surface expressed as:

$$z = \frac{c_x x^2 + c_y y^2}{1 + \sqrt{1 - (1+k_x)c_x^2 x^2 - (1+k_y)c_y^2 y^2}};$$

where $C_x$ is a curvature of the hyperbolic aspheric lens in an x-direction, $C_y$ is a curvature of the hyperbolic aspheric lens in a y-direction, $K_x$ is a conic coefficient of the hyperbolic aspheric lens in the x-direction, and $K_y$ is the conic coefficient of the hyperbolic aspheric lens in the y-direction.

8. The projection system of claim 7, the light source apparatus further comprises a first dichroic filter and a second dichroic filter, arranged over a light-emitting surface of the first light source sub-module and the second light source sub-module respectively and configured to filter each of the first beam of the primary colour light and the second beam of the primary colour light respectively.

9. The projection system of claim 8, wherein a far field of the first primary color light is in a Gaussian distribution, wherein the projection system further comprises a first diffusion plate and a second diffusion plate, respectively arranged between the first light source sub-module and the first dichroic filter and between the second light source sub-module and the second dichroic filter, wherein:

the first diffusion plate and the second diffusion plate are configured to diffuse the first beam of the first primary colour light and the second beam of the first primary colour light, such that a far field thereof is expanded to have a bi-directional flat top like distribution.

10. The projection system of claim 9, wherein each of the first diffusion plate and the second diffusion plate is configured to have two-way diffusion characteristics, having a diffusion half angle of approximately 1.2°-1.8° in a horizontal direction and of approximately 0.65°-1.05° in a pitch direction.

11. The projection system of claim 6, the light source apparatus further comprises at least one means for eliminating a speckle of a light field formed by the first primary colour light, wherein the at least one means comprises one or a combination of:

the transmission zone comprising a fan-shaped diffusion plate;

a collimation lens module arranged over a light-emitting surface of the first fluorescence plate; and a collimation compensation lens and a third diffusion plate arranged on an optical path of the first beam of first primary colour light, wherein the third diffusion plate is configured to have a continuously small movement.

12. The projection system of claim 11, wherein the third diffusion plate is mechanically coupled with a vibration motor, configured to have vibration frequency between 100 Hz and 300 Hz, and the third diffusion plate has a diffusion half angle between 2° and 3°.

13. The projection system of claim 8, the light source apparatus further comprises a first focusing lens module and a second focusing lens module, respectively arranged between the first dichroic filter and the first fluorescence plate and between the second dichroic filter and the second fluorescence plate, wherein each of the first focusing lens module and the second focusing lens module comprises, along a light transmission direction, a first focusing lens sub-module and a second focusing lens sub-module, respectively comprising an aspheric lens and a spherical lens, wherein:

an aspheric surface of the aspheric lens is expressed as:

$$z = \frac{c\rho^2}{1 + \sqrt{1-(1+k)c^2\rho^2}} + \Sigma A_n \rho^{2n};$$

where c is a curvature at a sphere vertex, k is a coefficient of an aspherical surface of a quadratic term, $A_n$ is a coefficient of the aspherical surface of a higher-order term, n is taken as 2-7, and r is a normalized radial coordinate.

14. The projection system of claim 1, wherein the light source apparatus is configured to emit the third primary colour light, and is further configured to obtain each of the first primary colour light and the second primary colour light by excitation on a corresponding fluorescence material by the third primary colour light.

15. The projection system of claim 14, wherein the light source apparatus comprises:

a light source module comprising a third light source sub-module and a fourth light source sub-module, configured to respectively emit a first beam of the third primary colour light and a second beam of the third primary colour light; and a third fluorescence plate, optically aligned with, and configured to receive, the first beam of the third primary colour light;

wherein:

the third fluorescence plate comprises a third fluorescence zone and a fourth fluorescence zone on a surface thereof facing the first beam of the third primary colour light, wherein:

the third fluorescence zone comprises a third fluorescence material capable of generating the first primary colour light upon excitation by the third primary colour light;

the fourth fluorescence zone comprises a fourth fluorescence material capable of generating the second primary colour light upon excitation by the third primary colour light; and the third fluorescence plate is further configured to have the third fluorescence zone and the fourth fluorescence zone to alternately face the first beam of the third primary colour light in a predetermined manner such that a beam of the first primary colour light generated from the third fluorescence zone and a beam of the second primary colour light generated from the fourth fluorescence zone are coupled in a time-sharing manner to be outputted as the fifth light field;

and the second beam of the third primary colour light is outputted as the sixth light field.

16. The projection system of claim 15, wherein the third fluorescence plate is in a form of a spinning wheel, with each of the third fluorescence zone and the fourth fluorescence zone arranged in a fan-shaped area on the spinning wheel, wherein an angle of the transmission zone and an angle of the first fluorescence zone are complementary, and are approximately 180° and approximately 180°, respectively; and the spinning wheel has a spinning rate of at least 7,200 rpm.

\* \* \* \* \*